(12) United States Patent
Marsolek et al.

(10) Patent No.: US 8,388,844 B2
(45) Date of Patent: Mar. 5, 2013

(54) INTIMATE COUPLING OF PHOTOCATALYSIS AND BIODEGRADATION IN A PHOTOCATALYTIC CIRCULATING-BED BIOFILM REACTOR

(75) Inventors: Michael Marsolek, Seattle, WA (US); Bruce E. Rittmann, Tempe, AZ (US)

(73) Assignee: Arizona Board of Regents for and on behalf of Arizona State University, Scottsdale, AZ (US)

(*) Notice: Subject to any disclaimer, the term of this patent is extended or adjusted under 35 U.S.C. 154(b) by 263 days.

(21) Appl. No.: 12/672,417
(22) PCT Filed: Aug. 8, 2008
(86) PCT No.: PCT/US2008/072657
§ 371 (c)(1),
(2), (4) Date: Dec. 14, 2010
(87) PCT Pub. No.: WO2009/023578
PCT Pub. Date: Feb. 19, 2009

(65) Prior Publication Data
US 2011/0089107 A1    Apr. 21, 2011

Related U.S. Application Data
(60) Provisional application No. 60/955,310, filed on Aug. 10, 2007.

(51) Int. Cl.
*C02F 3/08* (2006.01)
*C02F 1/32* (2006.01)
*C02F 1/72* (2006.01)
(52) U.S. Cl. ............ 210/617; 210/631; 210/748.09; 210/748.14; 210/151; 210/192
(58) Field of Classification Search .......... 210/616, 210/617, 631, 748.09, 748.14, 758, 763, 210/150, 151, 192, 209
See application file for complete search history.

(56) References Cited

U.S. PATENT DOCUMENTS

| | | | |
|---|---|---|---|
| 5,589,602 A | 12/1996 | Smith et al. | 585/671 |
| 6,024,876 A * | 2/2000 | Pannier et al. | 210/616 |
| 6,228,266 B1 * | 5/2001 | Shim | 210/617 |
| 6,531,035 B2 | 3/2003 | Tabatabaie-Raissi et al. | 204/157.15 |
| 6,866,788 B1 * | 3/2005 | Baig et al. | 210/150 |
| 6,936,170 B2 | 8/2005 | Shieh et al. | 210/630 |
| 7,160,461 B2 * | 1/2007 | Uphoff | 210/631 |
| 7,261,811 B2 * | 8/2007 | Nakhla et al. | 210/151 |
| 2004/0182792 A1 | 9/2004 | Subrahmanyam et al. | 210/748 |
| 2009/0032460 A1 * | 2/2009 | Yamasaki et al. | 210/151 |
| 2009/0266763 A1 * | 10/2009 | Yamasaki et al. | 210/151 |

OTHER PUBLICATIONS

Ku et al., "Decomposition of gaseous trichloroethylene in a photoreactor with TiO2-coated nonwoven fiber textile," *Applied Catalysis B. Environmental*, 34:181-190, 2001.

PCT International Search Report and Written Opinion, issued in International application No. PCT/US08/72657, dated Nov. 3, 2008.

PCT International Preliminary Report on Patentability, issued in International application No. PCT/US2008/072657, dated Feb. 16, 2010.

* cited by examiner

*Primary Examiner* — Christopher Upton
(74) *Attorney, Agent, or Firm* — Fulbright & Jaworski L.L.P.

(57) ABSTRACT

Systems and methods are provided for intimately coupling advanced oxidation process (AOP) with biodegradation for the treatment of contaminated water. The system comprises a particulate bed having carrier particles that have a microbial film effective for biodegrading contaminants in the contaminated water. An advanced oxidation reagent is irradiated by a radiation source to provide an advanced oxidation reagent effective for oxidizing recalcitrant compounds in the contaminated water to form biodegradable byproducts. The microbial film is effective for biodegrading the byproducts substantially immediately after they are produced. The carrier particles are also effective for protecting the microbial film from the radiation and/or the recalcitrant compounds.

24 Claims, 11 Drawing Sheets

US 8,388,844 B2

INTIMATE COUPLING OF PHOTOCATALYSIS AND BIODEGRADATION IN A PHOTOCATALYTIC CIRCULATING-BED BIOFILM REACTOR

CROSS-REFERENCE TO RELATED APPLICATIONS

The application is a national phase application under 35 U.S.C. §371 of international Application No. PCT/US2008/072657 filed Aug. 8, 2008, which claims priority to U.S. Provisional Patent Application Ser. No. 60/955,310, filed on Aug. 10, 2007. The entire contents of each of these applications are incorporated herein by reference.

STATEMENT REGARDING FEDERALLY SPONSORED RESEARCH OR DEVELOPMENT

This invention was made with government support under BES0402510 awarded by the National Science Foundation. The government has certain rights in the invention.

FIELD OF THE INVENTION

This invention relates generally to systems and methods for treating wastewater and other waters containing difficult-to-biodegrade organic compounds. More specifically, the present invention relates to systems that combine an advanced oxidation process (AOP) with biodegradation into an intimately coupled system.

BACKGROUND OF THE INVENTION

The proper treatment of contaminated water has become more and more important as the number of toxic and biologically recalcitrant organic compounds have increased in water. Commonly known systems are sequentially coupled, in that they involve a two-step process of advanced oxidation followed by biodegradation. In other words, sequentially coupled systems have chemical and biological treatment processes in separate stages.

In the ideal case of sequential coupling, advanced oxidation is controlled so that the recalcitrant organic compounds are only transformed to the point that they are rapidly biodegradable, at which point they would be passed to the biodegradation stage. Chemical transformation beyond this point generally wastes oxidant and increases operation costs with no further benefit. Because advanced oxidants are indiscriminate and fast acting, they produce a large range of products including those that are too oxidized, may be toxic themselves, or may be unavailable for biodegradation. If a large number of biodegradable compounds are present in the water in comparison to the number of recalcitrant compounds, much of the oxidant will be spent on already biodegradable organics and result in inefficient water treatment. In current systems, bacteria effective for biodegrading the biodegradable organics cannot be in proximity to the AOP, because the reactants used in advanced oxidation are severely toxic to bacteria. Thus, current systems do not allow for intimate coupling of AOP and biodegradation for at least the aforementioned reasons.

Thus, there is a need in the art for systems and methods for efficiently treating contaminated water using an intimately coupled advanced oxidation and biodegradation process that maintains the integrity of the necessary compounds used in these processes.

SUMMARY OF THE INVENTION

As embodied and broadly described herein, this invention, in one aspect, relates to a system for the treatment of contaminated water comprising a reaction vessel, a fluidizable particulate bed comprised of a plurality of porous carrier particles and an advanced oxidation reagent source disposed within the reaction vessel, a fluidizing mechanism for fluidizing the particulate bed carrier particles and the advanced oxidation reagent source, and a radiation source (e.g., an ultraviolet [UV] or visible light radiation source) for initiating advanced oxidation. In one aspect, the porous carrier particles have a microbial film deposited therein that is effective for biodegrading contaminants present within a water stream. As used herein, the term "reaction vessel" is to be interpreted broadly to include any structure configured to contain a volume of fluid.

In use, the radiation source can be configured to irradiate at least a portion of the advanced oxidation reagent source contained within the reaction vessel with radiation to provide an advanced oxidation reagent and/or to catalyze the advanced oxidation reaction. The contaminants present in the water stream can comprise both recalcitrant and biodegradable compounds. To that end, the system can be configured for at least substantially simultaneously oxidizing the recalcitrant compounds to form biodegradable byproducts, and biodegrading the biodegradable compounds in an integrated single stage system. Alternatively, the system can also be configured for biodegrading the oxidation byproducts substantially immediately after they are formed.

In another aspect, the present invention further provides methods of treating contaminated water. The methods generally comprise introducing porous carrier particles and at least one advanced oxidation reagent source into an internal volume of a reaction vessel. As summarized above, the porous carrier particles are provided having a microbial film deposited on at least a portion of the surface of the pore structure. The advanced oxidation reagent source is capable of providing at least one advanced oxidation reagent or otherwise participating in an advanced oxidation process when subjected to radiation (e.g. UV radiation). Water containing one or more contaminants can then be introduced into the reaction vessel to thereby contact the water with the microbial film and the advanced oxidation reagent source. The method further comprises irradiating the advanced oxidation reagent source with radiation to activate the advanced oxidation reagent source or to otherwise provide at least one advanced oxidation reagent capable of oxidizing one or more recalcitrant contaminant(s) present in the water and to provide at least one advanced oxidation degradation product.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

FIG. 9A shows the degradation of the methylene blue concentration over time as a function of slurry concentration. FIG. 9B shows calculation of the first-order rate constants from logarithm of concentration versus time.

DETAILED DESCRIPTION OF THE INVENTION

Figure 1:
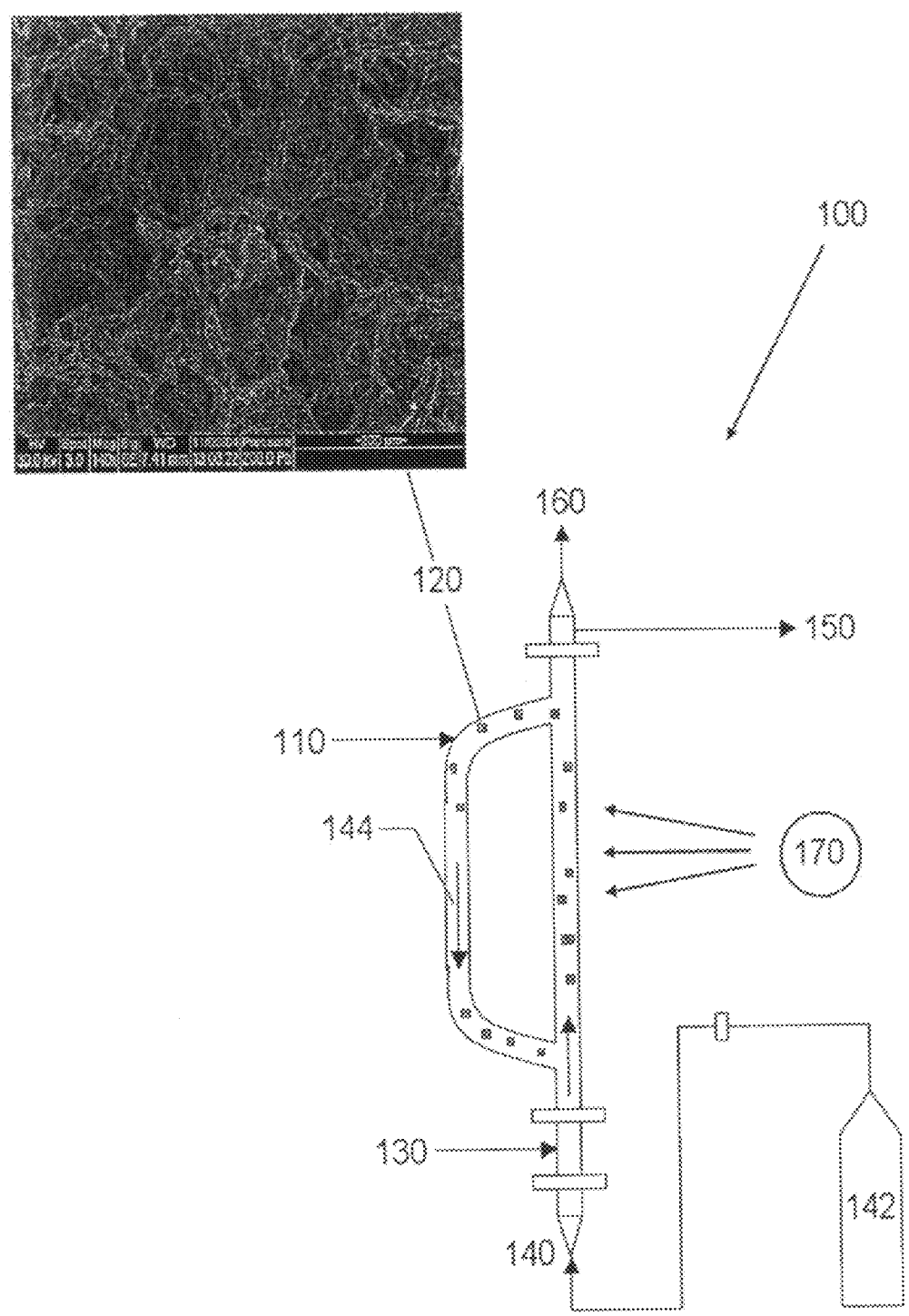
FIG. 1 is a schematic diagram of an exemplary system according to one embodiment of the invention and that was used to conduct certain examples described herein.

The present invention may be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

Those skilled in the art will recognize, or be able to ascertain using no more than routine experimentation, many equivalents to the specific embodiments of the invention described herein. Those of ordinary skill in the art will appreciate that various changes and modifications to this description may be made without departing from the spirit or scope of the present invention, as defined in the following claims.

In the claims articles such as "a", "an", and "the" may mean one or more than one unless indicated to the contrary or otherwise evident from the context. Thus, for example, reference to a "porous carrier particle" can include two or more such porous carrier particles unless the context indicates otherwise. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process.

Furthermore, it is to be understood that embodiments of the invention encompasses all variations, combinations, and permutations in which one or more limitations, elements, clauses, descriptive terms, etc., from one or more of the claims or from relevant portions of the description is introduced into another claim. For example, any claim that is dependent on another claim can be modified to include one or more limitations found in any other claim that is dependent on the same base claim. Furthermore, where the claims recite a composition, it is to be understood that methods of using the composition for any of the purposes disclosed herein are included, and methods of making the composition according to any of the methods of making disclosed herein or other methods known in the art are included, unless otherwise indicated or unless it would be evident to one of ordinary skill in the art that a contradiction or inconsistency would arise. In addition, embodiments of the invention encompass compositions made according to any of the methods for preparing compositions disclosed herein.

Where elements are presented as lists, e.g., in Markush group format, it is to be understood that each subgroup of the elements is also disclosed, and any element(s) can be removed from the group. It is also noted that the term "comprising" is intended to be open and permits the inclusion of additional elements or steps. It should be understood that, in general, where the invention, or aspects of the invention, is/are referred to as comprising particular elements, features, steps, etc., certain embodiments of the invention or aspects of the invention consist, or consist essentially of, such elements, features, steps, etc. For purposes of simplicity those embodiments have not been specifically set forth in haec verba herein. Thus for each embodiment of the invention that comprises one or more elements, features, steps, etc., the invention also provides embodiments that consist or consist essentially of those elements, features, steps, etc.

Where ranges are given, endpoints are included. Furthermore, it is to be understood that unless otherwise indicated or otherwise evident from the context and/or the understanding of one of ordinary skill in the art, values that are expressed as ranges can assume any specific value within the stated ranges in different embodiments of the invention, to the tenth of the unit of the lower limit of the range, unless the context clearly dictates otherwise. It is also to be understood that unless otherwise indicated or otherwise evident from the context and/or the understanding of one of ordinary skill in the art, values expressed as ranges can assume any subrange within the given range, wherein the endpoints of the subrange are expressed to the same degree of accuracy as the tenth of the unit of the lower limit of the range. Ranges may be expressed herein as from "about" one particular value, and/or to "about"

another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Reference will now be made in detail to the present preferred aspects of the invention, examples of which are illustrated in the accompanying drawings. Wherever possible, the same reference numbers are used throughout the drawings to refer to the same or like parts.

As briefly summarized above, according to one aspect of the present invention, a system is provided for the treatment of water comprising one or more recalcitrant and/or biodegradable contaminants. To that end, FIG. 1 schematically illustrates an exemplary treatment system 100 according to one aspect of the present and that was used to conduct certain examples described in the Examples which follow. It should be understood that the components of exemplary systems described herein can be arranged and configured differently than shown in FIG. 1 while still remaining within the scope of the present invention.

As shown, the exemplified system 100 can in one aspect comprise a reaction vessel 110 having an internal volume configured to re-circulate a fluidized particulate bed that is disposed within the internal volume of the vessel. The particulate bed comprises a plurality of porous carrier particles 120 having a microbial film deposited therein. The microbial film can be effective for biodegrading at least one contaminant present within a water stream. The reaction vessel can further define a contaminated water inlet 130, a gas inlet 140, a treated water outlet 150, and a gas outlet 160, all of which can be in communication with the internal volume. When in use, at least one advanced oxidation reagent source can also be disposed within the internal volume of the reaction vessel.

A gas supply 142 can be provided in communication with the gas inlet 160 for fluidizing the particulate bed carrier particles and the at least one advanced oxidation reagent source in order recirculate the particulate bed carrier particles and advanced oxidation reagent source in a direction of flow 144. In one aspect, the gas supply can be an oxygen-containing gas that simultaneously fluidizes the particulate bed as well as providing oxygen for the advanced oxidation reaction. In other aspects, a mechanical agitator may be used to fluidize the particulate bed.

The system further comprises a radiation source 170 configured to irradiate at least a portion of the advanced oxidation reagent source contained within the reaction vessel with radiation to initiate the advanced oxidation reaction. In certain embodiments, radiation source 170 may comprise a ultraviolet (UV) radiation source. In other embodiments, radiation source 170 may comprise a visible light radiation source. In one aspect, the advanced oxidation reagent can be the same component as the advanced oxidation reagent source. According to this aspect, the radiation can activate the advanced oxidation reagent source for participation in the advanced oxidation reaction.

The advanced oxidation reagent source can be disposed within the reaction vessel in slurry form. In this aspect, the AOP substantially takes place in the bulk solution of the internal volume. Optionally, at least some of the porous carrier particles can be impregnated with the advanced oxidation reagent source, such as on or proximate the surface of the particles. In this aspect, the AOP substantially takes place on the surface of the carrier particles. In yet another aspect, the advanced oxidation reagent source can be disposed within the reaction vessel in slurry form and also fixed on the surface of the carrier particles. In any aspect, the microbial film can be protected within pores of the carrier particles from the radiation, toxic contaminants within the water, and any other particles or compounds within the internal vessel that can have damaging or toxic effects on the microbial film. Such compounds can include, for example, known reactants used in advanced oxidation processes such as $O_3$, $H_2O_2$, Fenton's reagent, and OH free radical. The microbial film can also be protected within the pores from physical loss. In a particular aspect, the advanced oxidation reagent source is $TiO_2$. In a specific embodiment, the advanced oxidation reagent source comprises AEROXIDE® $TiO_2$ P 25 provided by Evonik Degussa. In still other embodiments, the advanced oxidation reagent source comprises zinc oxide (ZO). As described above, the $TiO_2$ can be present within the internal volume in a slurry, can be fixed on or impregnated into the surface of the porous carrier particles, or both.

The water contaminants, in various aspects, can comprise both recalcitrant and biodegradable compounds. The advanced oxidation reagent is configured to oxidize recalcitrant compounds and transform these compounds into biodegradable byproducts. The microbial film deposited within the carrier particles are configured to react with and biodegrade the byproducts. Whether the advanced oxidation reagent and/or reagent source are present in slurry form or fixed to the surface of the carrier particles, the microbial film is in sufficient proximity to the AOP such that the biodegradable byproducts can be substantially immediately biodegraded as they are produced by the AOP. Similarly, the microbial film can react with any biodegradable compounds present in the water stream substantially immediately, thereby avoiding needless oxidation of these compounds.

In use, the system of the present invention also provides a method of treating water comprising at least one contaminant. In one aspect, the method comprises providing a plurality of porous carrier particles having a microbial film effective for biodegrading at least one contaminant present within a contaminated water stream deposited therein. At least one advanced oxidation reagent source can be provided that is capable of providing at least one advanced oxidation reagent when subjected to radiation. Further, the plurality of porous carrier particles and the at least one advanced oxidation reagent source can be introduced into an internal volume of a reaction vessel. The method further comprises introducing contaminated water containing at least one contaminant into the internal volume of the reaction vessel to thereby contact the water with the microbial film and with the at least one advanced oxidation reagent source. The method can also comprise irradiating the at least one advanced oxidation reagent source with radiation (e.g. UV radiation) to provide at least one advanced oxidation reagent capable of oxidizing the at least one contaminant in the water stream and to provide at least one advanced oxidation degradation product.

As described above, the microbial film can also be effective for biodegrading the at least one advanced oxidation degradation product. The contaminant present in the water can comprise both recalcitrant and biodegradable compounds. The microbial film, thus, can be effective for biodegrading the biodegradable compounds substantially simultaneously with the advanced oxidation reagent oxidizing the recalcitrant compounds to provide the advanced oxidation degradation product(s). As the advanced oxidation degradation products are formed, they can be substantially immediately biodegraded by the microbial film.

In other aspects, the method can comprise providing $TiO_2$ as the advanced oxidation reagent source. Whether the advanced oxidation reagent source is $TiO_2$ or another compound, it can be studded or impregnated onto or proximate the surface of the porous carrier particles. Optionally, the advanced oxidation reagent source can be provided in slurry form. In yet another aspect, the advanced oxidation reagent source can be provided in slurry form and impregnated into the porous carrier particles.

EXAMPLES

The following examples are put forth so as to provide those of ordinary skill in the art with a complete disclosure and description of how the apparatuses, systems and/or methods claimed herein are made and evaluated, and are intended to be purely exemplary of the invention and are not intended to limit the scope of what the inventors regard as their invention. Efforts have been made to ensure accuracy with respect to numbers (e.g., frequency measurements, etc.), but some errors and deviations should be accounted for.

In the following examples, contaminated water was used that contained one or both of the exemplary recalcitrant compounds 2,4,5-trichlorophenol (TCP) and sodium acetate (a biodegradable organic chemical). The known photocatalyst $TiO_2$ was used as the advanced oxidation reagent source. $TiO_2$-photocatalysis is capable of transforming and degrading a wide variety of toxic organics, including many chlorinated aromatics.

Four examples were conducted: (1) intimately coupled UV-photolysis and biodegradation using acetate; (2) intimately coupled slurry $TiO_2$-photocatalysis using TCP and acetate; (3) intimately coupled fixed $TiO_2$-photocatalysis using TCP and acetate; and (4) full intimate coupling with studded carrier particles and slurry $TiO_2$. These examples demonstrate that the intimately coupled systems described herein are efficient and capable of coupling a microbiological biodegradation processes with UV-mediated advanced oxidation, despite the presence of toxic concentrations of organics and free radicals in the bulk medium.

In each example, a bench-scale version of the exemplary system schematically shown in FIG. 1 was used. The liquid volume of the reaction vessel was approximately 122 with roughly equal volumes in the riser and downcomer sides (illustrated by the up and down flow arrows, respectively). Circulation was achieved through bubbling air up the riser, which also provided oxygen for aerobic respiration and the advance oxidation process. The air was filtered prior to entering the reaction vessel.

The microbial biomass was added to the carrier particles by placing them in activated sludge inoculum from the Stickney Wastewater Treatment Plant (Calumet City, Ill.). Microbial film was allowed to grow on the carrier particles for durations from 1 day (used in Example 3), to 2 days (used in Example 1), to 10 days (used in Example 2). In Example 3, in which the carrier particles were studded with TiO2, a 1:5 dilution of the activated sludge was used to ensure the coating on the surface of the carrier particles would not be too thick. In case of the examples with TCP (Examples 2 and 3), the activated sludge was adapted to the chlorinated aromatic for 7 days at 20 µM prior to adding the carrier particles. Forty carrier particles (hereinafter "cubes") were added at the beginning of each example, with five cubes periodically removed to monitor biomass. The use of the term "cubes" herein is not intended to limit the porous carrier particles to the shape of a cube. This term is used for nomenclature purposes only and is not intended to limit the carrier particles to any particular shape or size.

The reaction vessel was illuminated using a high-intensity UV lamp (UVP-B-100AP, UVP Products, USA) with a 100-watt long-wave bulb (21,700 µW/cm$^2$). The bulb diameter was 6 inches and illuminated approximately 30% of the total internal volume of the reaction vessel for the orientation used in Example 1, and 50% for Examples 2 and 3. The illuminated area was covered with aluminum foil to reflect light, maximizing illumination with the reactor.

In the various examples, liquid samples were collected from the outlet of the reaction vessel and filtered through a 0.2-µm membrane filter (Whatman #6872-2502, PVDF membrane). The liquid samples were analyzed for chemical oxygen demand (COD) and substrate concentrations. HACH closed-reflux method COD digester tubes were used to monitor COD, a Hitachi D-7000 HPLC system having a Supelco SupelcoSil LC18 column (25 cm×4.6 mm) was used for HPLC analysis of TCP, and a BioRad Aminex 87*h* column was used for monitoring acetate. The HPLC elution solvent was 70% pure HPLC-grade methanol plus 30% acetic acid in water (2% vol/vol) for the LC18 column, and dilute phosphoric acid in water (0.04% vol/vol) for the Aminex column. Sample peak heights were compared to peak heights of standards to quantify concentrations.

In each example, cubes were periodically removed from the reaction vessel to monitor biomass accumulation. The cubes were dried and weighed and compared to bare cubes to determine biomass accumulation. At the end of each example, some cubes were fixed in a 10% paraformaldehyde solution for future SEM analysis, and some were immediately stained and analyzed using confocal laser scanning microscopy (CLSM). Photographs were taken with a digital camera.

For cubes with biomass preservation in a paraformaldehyde solution, cubes were dried using a critical point dryer (Polaron critical point dryer), coated with 5 nm of gold (Cressington 208HR Sputter Coater), and visualized on a Hitachi S-3500N SEM. For cubes without biomass (bare cubes, cubes studded with TiO2), they were air dried, coated with 5 nm of gold, and similarly visualized. Uncoated carriers were visualized on an FEI Quanta sFEG environmental SEM.

Confocal laser scanning microscopy images were acquired using a Zeiss LSM 510 (Carl Zeiss, Jena, Germany). Cubes were removed from the reactor and immediately placed in a Live/Dead stain (LIVE/DEAD BacLight viability stain; Molecular Probes Inc., Eugene, Oreg.) for 15 minutes on a rocker table, followed by 15 minutes of rinsing (×2). The cubes were then fixed onto a petri dish using silicone sealant, the dish was filled with water, and the cubes were visualized using a water-immersion lens (60×).

Example 1

Intimately Coupled UV-Photolysis and Biodegradation Using Acetate

The first example was conducted to test the least harsh environment: UV illumination with only acetate. A medium of 5 mM acetate was fed to the system and, upon establishing a baseline performance of UV photolysis alone, 40 cubes were added having 2-days growth of microbial film. The flow rate was 20 mL/hr, giving a hydraulic retention time (HRT) of approximately 6 hours. Acetate was monitored in the effluent and biomass accumulation on the cubes. Finally, SEM was used to visualize the microbial film and CLSM was used to determine if the biomass was living.

Figure 2:
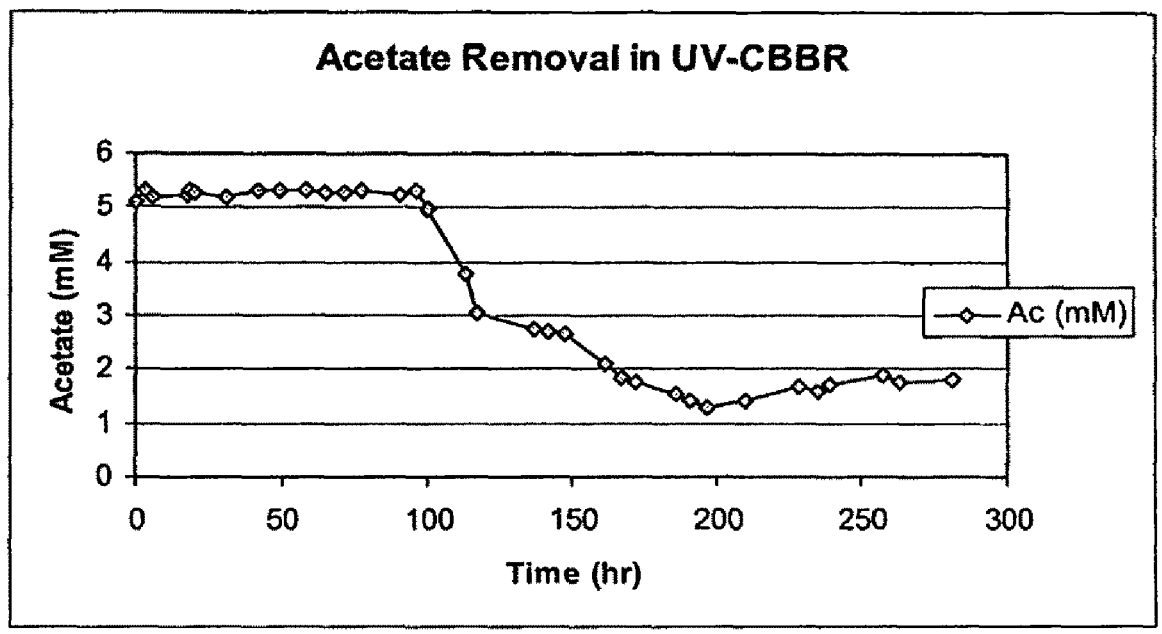
FIG. 2 is a graphical illustration of the effluent acetate concentration as a function of time and reactor conditions as measured pursuant to Example 1.

FIG. 2 shows the effluent acetate concentration as a function of time and reactor conditions. UV photolysis alone, from 0-96 hours, showed no acetate degradation. Once the cubes with microbial film were added (hour 96), acetate was quickly degraded, and the acetate removal was sustained over a period of 190 hours, over 30 HRTs with continuous UV illumination. This removal was thus sustained in spite of the cubes being exposed to UV radiation.

The biomass data are presented in Table 1. Biomass was initially lost from the cubes, but consequently re-grew in correlation with acetate degradation. Biomass sampling resulted in cubes being removed from the system, and this lowered the total biomass in the reaction vessel over time. Nonetheless, the total biomass increased after 45.5 hours, and acetate removal was almost constant after about 200 hours. The net biomass yield increased over time due to the removal of biomass with sampling.

TABLE 1

| Time from cube addition (hr) | Biomass/ cube (mg) | Total Biomass (mass/cube × # of cubes remaining) | ΔBiomass/ ΔCOD |
|---|---|---|---|
| 0 | 1.98 | 99 | |
| 45.5 | 0.9 | 45 | 0.197 |
| 101 | 1.16 | 52.2 | 0.228 |
| 182.8 | 1.48 | 59.2 | 0.259 |

Figure 3:
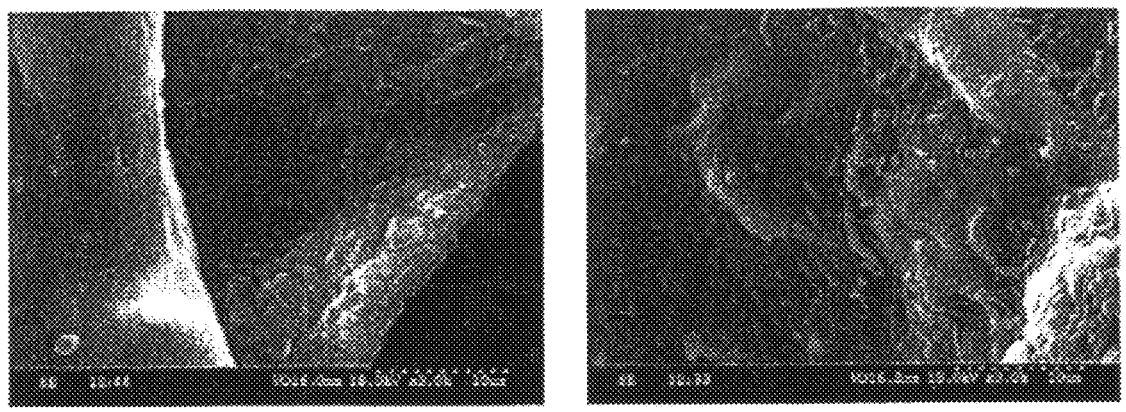
FIG. 3 is and SEM micrograph image indicating growth and sustainability of biomass in an inventive apparatus under steady UV illumination.
Figure 4:
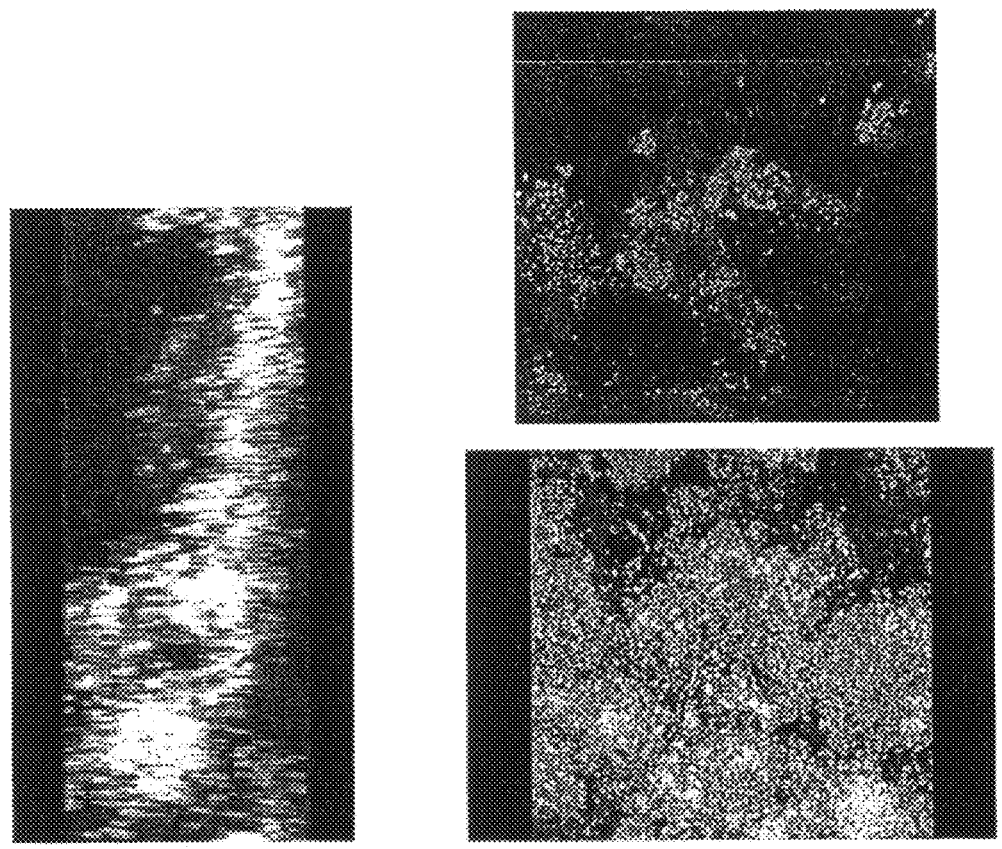
FIG. 4 is a CLSM image indicating growth and sustainability of biomass in an inventive apparatus under steady UV illumination.

The biomass data demonstrate that biomass grew and sustained itself in the reaction vessel under steady UV illumination. Further support is provided via SEM and CLSM images, shown in FIGS. 3 and 4, respectively. The left-hand picture of FIG. 3 shows SEM images of the exterior of the cubes; the right-hand picture shows SEM images of the interior of the cubes. Both were taken after 180 hours in the reaction vessel. The interior image clearly shows microbial formation along the walls of the cube, while the image near the exterior indicates that the exterior face of the cube is free of microbial cells, while a "ledge" behind the face has microbial film. FIG. 3 thus shows that the microbial film is located away from the outer surface of the cubes. This confirms the concept that the microbial film grows inside the carrier particles, wherein it is protected from UV irradiation and strong detachment forces. FIG. 4 illustrates CLSM images near the exterior (top) and interior (left and bottom) of the cubes after 180 hours in the reaction vessel. The interior images are z-stacks from the side (left) and up through the stack of images (bottom). The images clearly show live cells and cells located along the wall of the cubes, not in "chunks" of microbial film filling up the pores of the carrier particles. Thus, FIG. 4 shows that the microbial film is largely alive and lines the pore walls of the carrier particles.

In summary, the Example 1 clearly shows that bacteria inside the carrier particles are alive, growing as a microbial film, and metabolically active, despite continuous illumination with UV radiation. In short, the microbial film was protected in the cubes from toxic irradiation (and detachment), and it gave substantial substrate removal even though the conditions in the bulk liquid were very harsh.

Example 2

Intimately Coupled Slurry $TiO_2$-Photocatalysis Using TCP and Acetate

Evonik Degussa P25 $TiO_2$ was used at 0.5 g/L for slurry photocatalysis examples. Photocatalytic conditions challenge the bacteria with toxic hydroxyl radicals and TCP, along with UV irradiation—an even harsher environment than UV-photolysis alone. In this example, a 0.5 g/L slurry of $TiO_2$ with 2.5 nM acetate and 100 μM TCP was continuously applied.

Figure 5:
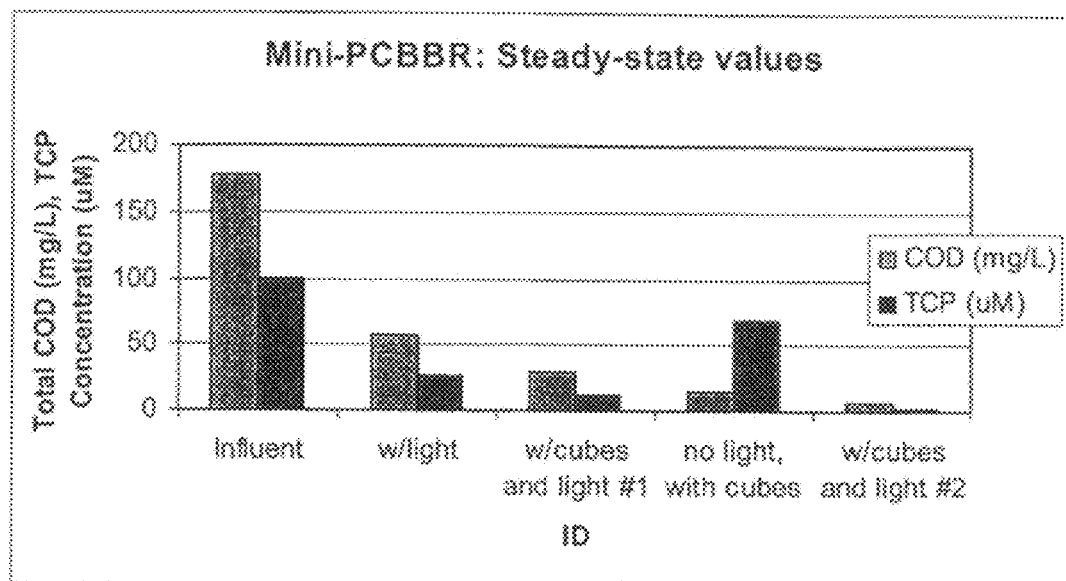
FIG. 5 illustrates the COD and TCP concentrations at the end of each of the various stages of operation of an exemplary apparatus according to one embodiment of the present invention.
Figure 6:
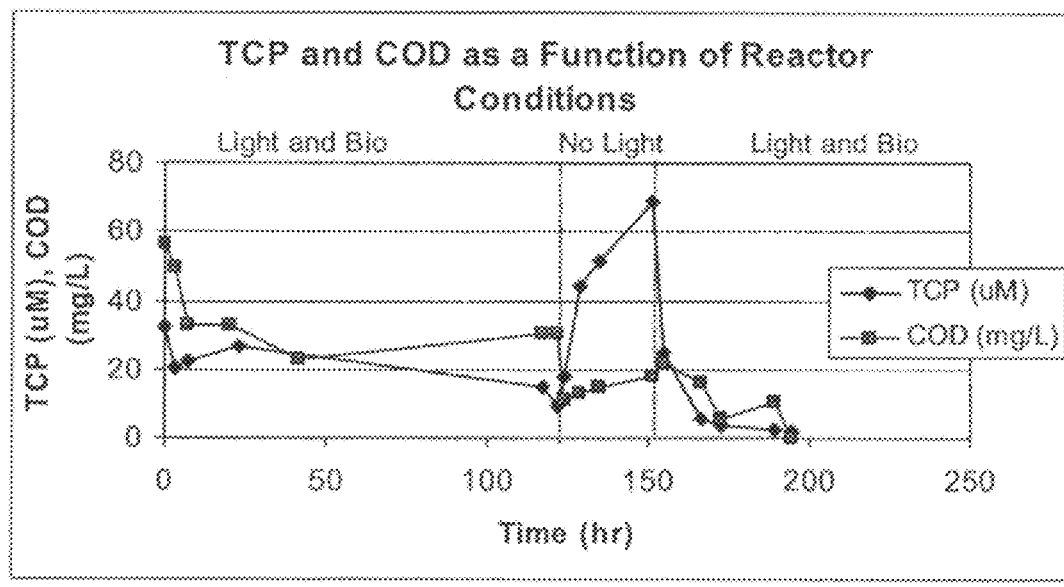
FIG. 6 illustrates the time courses of the concentrations reported in FIG. 5.

FIG. 5 shows the COD and TCP concentrations at the end of each of the various stages of operation: (1) influent, (2) photocatalysis with UV-light turned on, (3) full PCBBR operation with simultaneous photocatalysis and biodegradation (identified as "w/cubes"), (4) light turned off and biodegradation only, and (5) full PCBBR operation repeated. FIG. 6 shows the time courses of the concentrations.

Photocatalysis alone (labeled "w/light") showed appreciable COD and TCP removals due to photocatalysis (~70% of the removal), while air stripping also removed some of the volatile TCP (20-40% of influent TCP), but COD and TCP residuals were 31% and 25%, respectively. Addition of cubes with protected microbial film for full PCBBR operation, i.e., simultaneous photo-catalysis and biodegradation noted as "w/cubes and light", decreased the COD and TCP concentrations much lower, giving residuals of 17% and 10%, respectively, in the first trial (#1). Removals were still better in the second trial (#2): Residuals were only about 2% and 1%, respectively.

Figure 7:
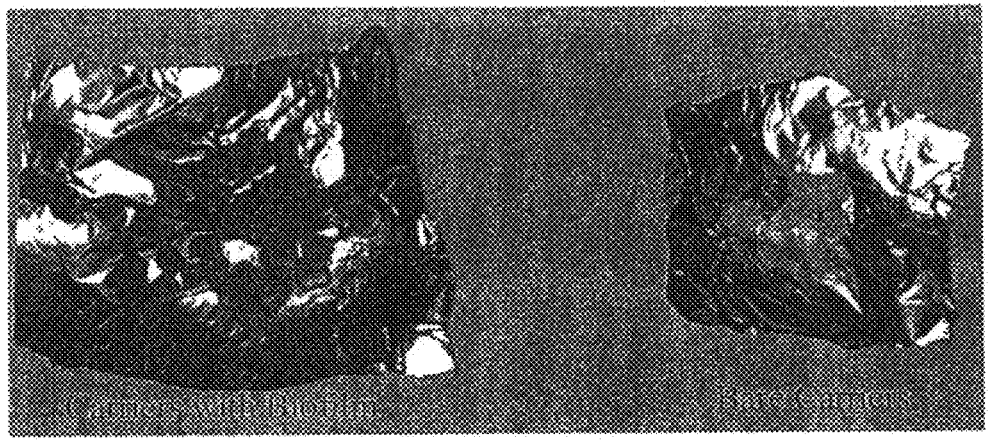
FIG. 7 illustrates a comparison of bare cubes versus cubes with biomass. As shown, the microbial film accumulation is noticeable in the left image.
Figure 8:
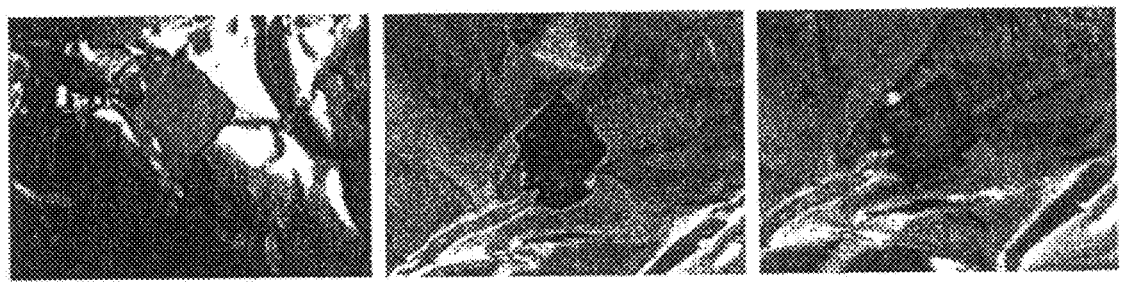
FIG. 8 shows the differential effect of photocatalysis on the biomass at the conclusion of a $TiO_2$ slurry example.

When the light was turned off, eliminating photocatalysis, the TCP concentration quickly and steadily rose to about 70 μM in 24 hours (4 HRTs), or a residual of 70% (FIG. 6). These results indicate that photocatalysis was responsible for most of the TCP removal. It is possible that the TCP concentration would not have reached the influent level of 100 μM (FIG. 6), but the trajectory suggests little to no biodegradation of TCP, an outcome consistent with the slow kinetics associated with TCP biodegradation and its inhibitory effects. On the other hand, COD removal initially improved once the light was turned off in spite of growing concentrations of inhibitory TCP, since the microbial film was accumulating and the COD due to TCP (17.6 mg/L at 100 μM TCP) is low compared to the acetate COD. By the end of this time, the overall COD began to slowly climb in correlation with increasing TCP concentration The slurry-$TiO_2$ conditions made it difficult to monitor the biomass concentration by mass difference, since the cubes captured catalyst particles. However, simple photographic imaging of the cubes shows the striking effect of the photocatalysis on the cubes and biology. FIG. 7 shows images of bare cubes versus cubes with biomass; the microbial film accumulation is noticeable in the left image. FIG. 8 shows the differential effect of photocatalysis on the biomass at the end of the slurry $TiO_2$ example. The cubes on the left are bare cubes. The structure of the cubes was not damaged, and they retained their "spongy" structure, but it is obvious that the biomass on the outside of the cube was thoroughly oxidized (i.e., "charred") (middle). When the cube was cut (right), the interior of the cube still looked identical to the cubes prior to adding them to the reactor, validating that the toxic effects of hydroxyl radical did not reach deep into the cube and biomass could be protected within.

In summary, this example showed that the concepts underlying aspects of the present invention were valid with photocatalytic production of free radicals and a toxic substrate (TCP) present, in addition to UV irradiation. The full PCBBR system gave nearly complete removals of TCP and COD, and microbial film accumulated inside the macroporous carriers Example 3

Intimately Coupled Fixed $TiO_2$-Photocatalysis Using TCP and Acetate

Evonik Degussa P25 $TiO_2$ was used at 20 g/L for fixing $TiO_2$ onto the carrier particles (cubes). The method used to fix P25 to the cubes was as follows: 0.1 g of surfactant, dioctyl sulfosuccinate (Aldrich Chemical Co.), was dissolved in double-deionized water prior to adding $TiO_2$. This mixture was mixed overnight on a shaker table prior to adding the cubes. The cubes were then shaken with the $TiO_2$ slurry for 24 hours, the mixture was poured into a drying basin, and the slurry was allowed to evaporate onto the cubes. The cubes were baked at 100° C. for 16 hours and rinsed of poorly adhering $TiO_2$ by adding them to double-deionized water and shaking the slurry at 130 rpm on a shaker table. The rinse water was repeatedly exchanged until no more $TiO_2$ was removed from the cubes, as monitored by a decrease in cube dry-weight. The mass of $TiO_2$ deposited onto the surface was determined by comparing to the dry-weight of the cubes prior to adding $TiO_2$.

Another method was used to fix TiO2 to the surface of the cubes, namely a sol-gel technique. The sol was formed by first preparing a mixture of 32 mL ethanol, 2 mL concentrated HCl, and 1.2 mL double deionized water. A mixture of 4.0 mL titanium isopropoxide in 8 mL isopropyl alcohol was then added drop-wise with stirring. The cubes were present in the ethanol mixture prior to adding the titanium isopropoxide. As soon as the sol was formed, the entire mixture was placed into a dialysis bag (Snakeskin® tubing, 3500 MWCO, Pierce) and dialyzed in double-deionized water for 3 days, with 3 exchanges of the water. Dialysis was necessary because the cubes are susceptible to acid-catalyzed hydrolysis; by forming the gel via dialysis, the acid concentration near the cubes could be quickly decreased. Once the gel was formed, the cubes were air-dried, and then dried further in a desiccator or in a drying oven (100° C.) overnight and compared to their dry-weight prior to adding the gel.

Methylene blue oxidation was used to test the photocatalytic activity of the studded cubes. Methylene blue is ideally suited for gauging the effectiveness of TiO2 photocatalysis, as it undergoes a bleaching process in the presence of TiO2/UV, and its concentration is easily monitored by tracking the absorbance at 660 nm. A 100×50-mm beaker was filled with 50 mL of 2.95 μM methylene blue and 25 studded cubes were added. The solution was mixed on a rocking table located directly beneath a high intensity (21,700 $\mu W/cm^2$ long-wave UV lamp (UVP Products, USA). The samples were filtered and absorbance was monitored at 660 nm calibrated versus a set of standards. Control examples run with only methylene blue and UV light showed negligible methylene-blue degradation; control examples with methylene blue and un-studded cubes and UV light showed some adsorption of methylene blue within the first two hours, but no continuous degradation.

Figure 9A:
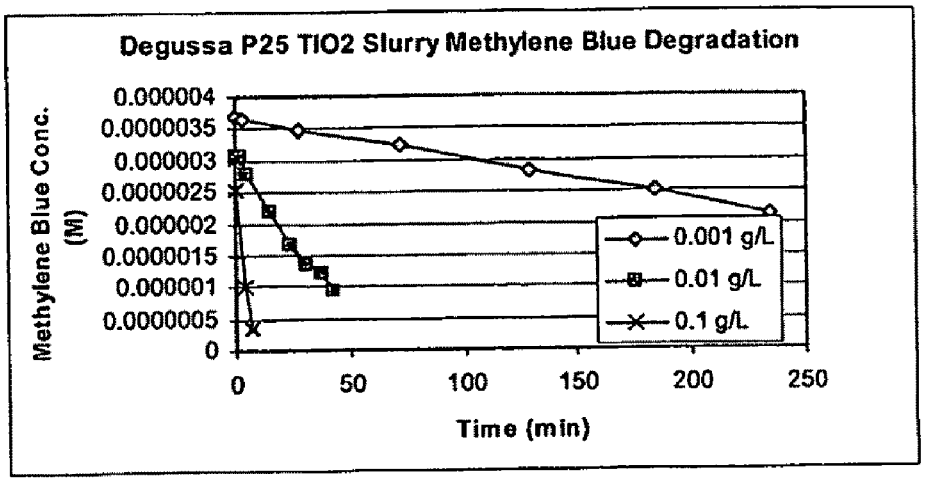
FIG. 9a, 9b, ands 9c illustrate methylene blue degradation data.
Figure 9B:
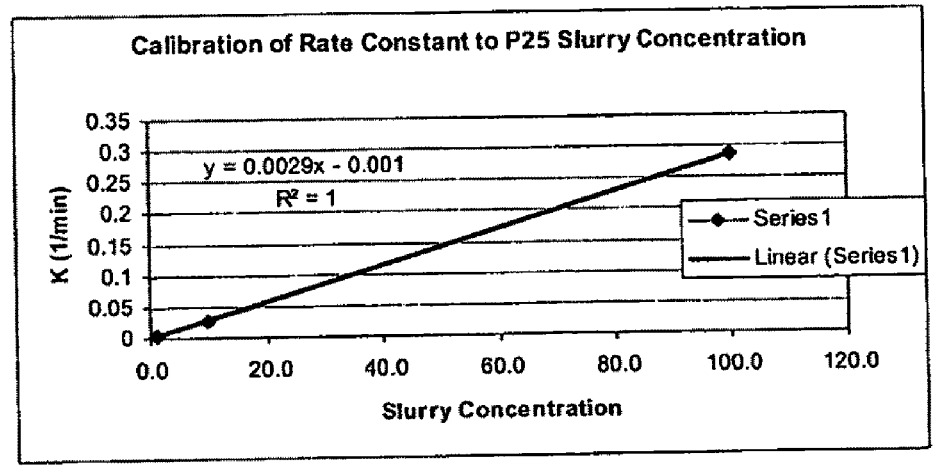
Figure 9C:
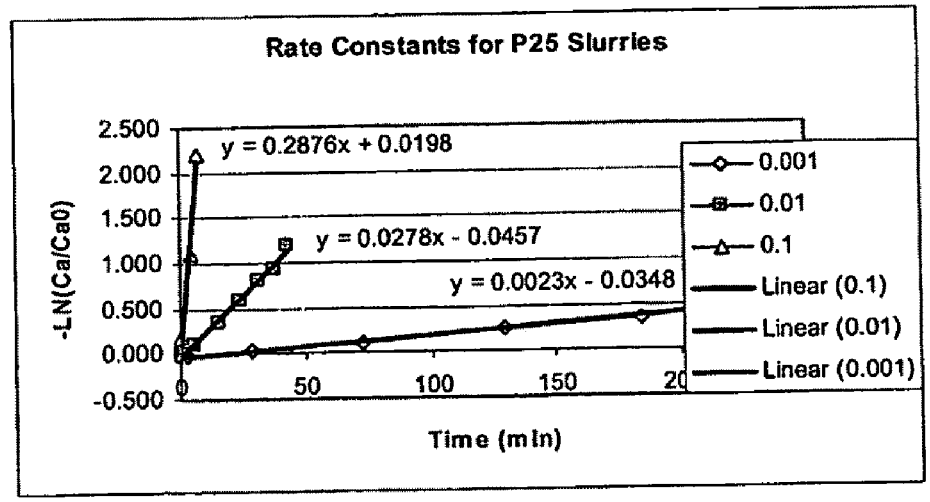
FIG. 9C shows how the first-order constants vary with P25 concentration.

Prior to testing actual cubes, different slurry-$TiO_2$ concentrations were run to determine how the first-order rate constant for the example system depends on the $TiO_2$ concentration. A slurry catalyst is typically the most photoactive form. In this way, the first-order rate constants can be used to gauge the equivalent mass of slurry-$TiO_2$ that would produce the same effect as the $TiO_2$ on the cubes. FIGS. 9A-9C show the methylene blue degradation data used to generate this baseline. It is clear that the methylene blue photocatalytic degradation followed first-order kinetics, and the first-order rate constant depended on the P25 concentration according to: $k_1$ (min$^{-1}$)=0.0029 [MB (M)]−0.001 min$^{-1}$. FIG. 9A shows the degradation of the methylene blue concentration over time as a function of slurry concentration. FIG. 9B shows calculation of the first-order rate constants from logarithm of concentration versus time. FIG. 9C shows how the first-order constants vary with the P25 concentration.

Figure 10:
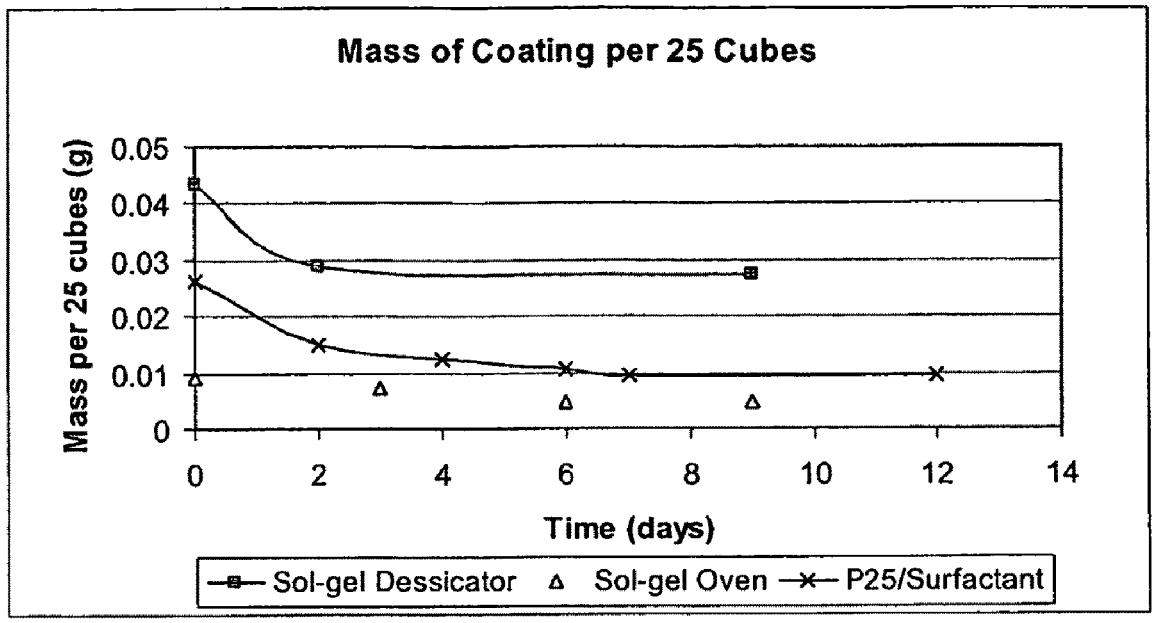
FIG. 10 illustrates remaining levels of catalyst after several cycles of rinsing pursuant to Example 3 as described herein.

As described above, a variety of methods to fix catalyst to the cube surface were employed. The first method, evaporating slurry-form PMTP Degussa P25 directly onto the cubes, was the most direct and straightforward means, but the majority of the catalyst was rinsed off after the initial studding. Use of a surfactant, dioctyl sulfosuccinate, during coating (Ku et al., 2001) to decrease repulsive forces due to surface tension resulted in a coating that adhered more strongly. Sol-gel methods were also used, with drying either at 100° C. (oven) or in a dessicator at room temperature. FIG. 10 shows how much catalyst remained after cycles of rinsing. The P25 with surfactant gave the most satisfactory results.

These methods were then analyzed to determine if repeating the methods could increase the mass of catalyst fixed onto the cubes. Repeating of the sol-gel method allowed more catalyst to be fixed onto the surface with each cycle (after rinsing), whereas the PMTP method did not result in increased catalyst loading with each cycle, as shown in Table 2.

TABLE 2

| cycle | P25 + Surfact. (g): | Sol-gel: desiccator (g) | Sol-gel: drying oven (g) |
|---|---|---|---|
| 1 | 0.011 | 0.028 | 0.003 |
| 2 | 0.011 | 0.034 | 0.004 |
| 3 | — | 0.029 | 0.007 |
| 4 | — | 0.038 | 0.021 |
| 5 | — | 0.049 | |

Figure 11:
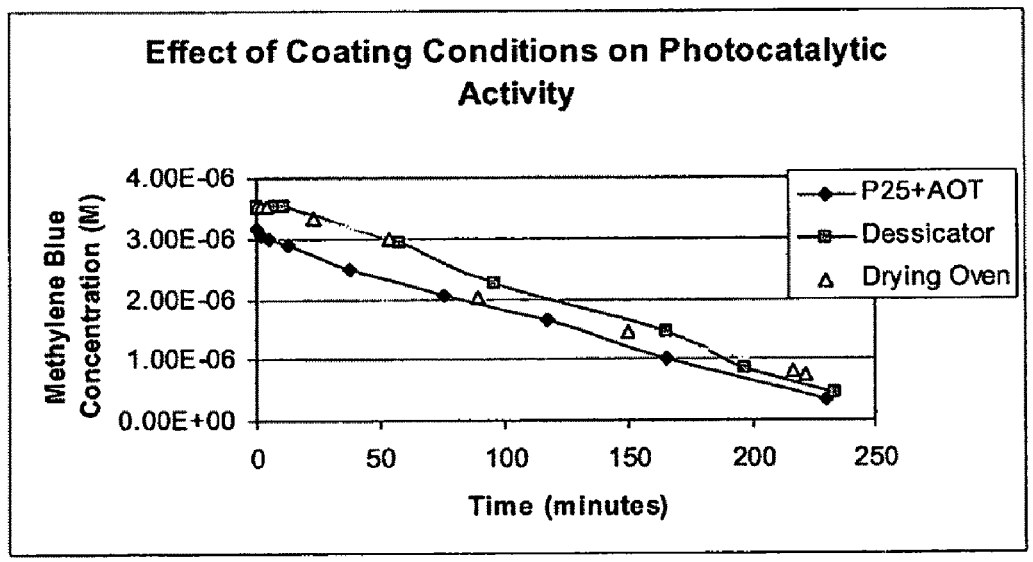
FIG. 11 reports the photocatalytic activity of the carrier cubes identified in Table 2.

Cubes from the last cycle reported in Table 2 were tested to determine their photocatalytic activity. The results are shown in FIG. 11. All three coated cubes were photoactive. The data from FIG. 11 was used to calculate the first-order rate constants, and then the slurry calibration from FIG. 9 was used to calculate the equivalent mass of slurry P25 that would result in this rate of degradation. The computations are summarized in Table 3, which indicates that all three methods were relatively inefficient on a per-mass basis as compared to slurry $TiO_2$. The sol-gel method with heating at 100° C. in an oven gave the highest first-order rate, but the P25 with surfactant had the highest fractional rate compared to slurry $TiO_2$. The efficiency column is the ratio of the calculated P25 mass in 50 mL, the volume of the examples, to actual mass adhered to the cubes, used to gauge the activity per unit catalyst. For these calculations, the entire coating mass was assumed to be from catalyst, although gel and surfactant likely contributed to the total mass. Based on these data, it was decided to test the P25/surfactant method in more depth because it gave the highest fractional activity and did not require repeated cycling to prepare.

Table 3

TABLE 3

| ID | Mass TiO2 per 25 cubes (mg) | k (1/min) | Number of Coating Cycles | Calculated P25 Equivalent (mg/L) | Catalyst Efficiency (P25 Equivalent/ Actual Mass of $TiO_2$): |
|---|---|---|---|---|---|
| Desiccate | 49 | 0.0055 | 5 | 3.16 | 0.003 |
| Drying Oven | 21 | 0.0101 | 4 | 3.85 | 0.009 |
| P25 + Surfactant | 11 | 0.0087 | 1 | 3.37 | 0.015 |

Figure 12:
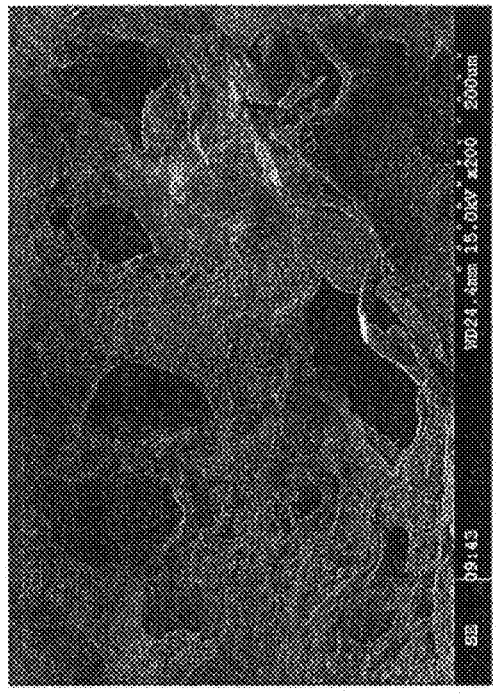
FIG. 12 shows SEM images of the P25/surfactant-coated cubes, together with an EDS analysis that indicates the existence of the titanium coating pursuant to Example 3 as described herein.
Figure 12:
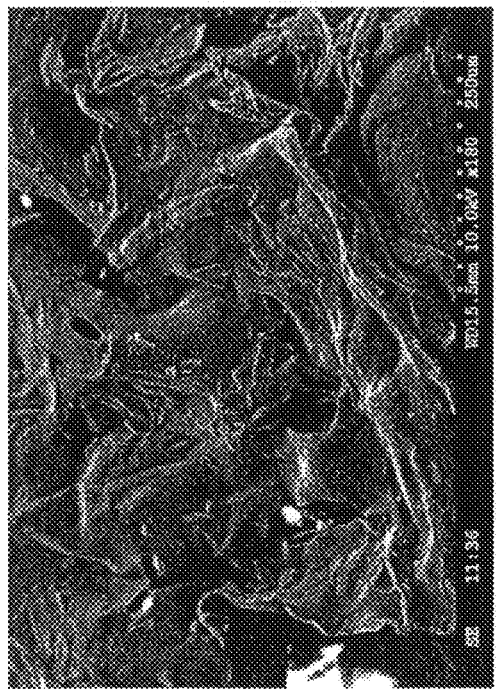
Figure 12:
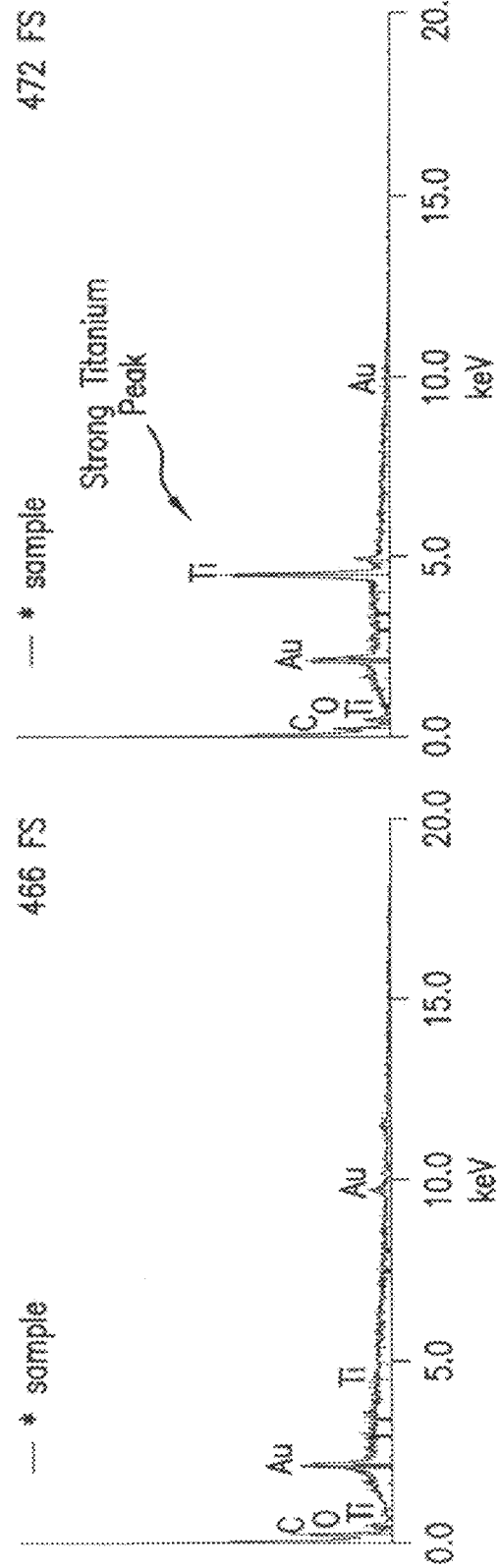
Figure 13:
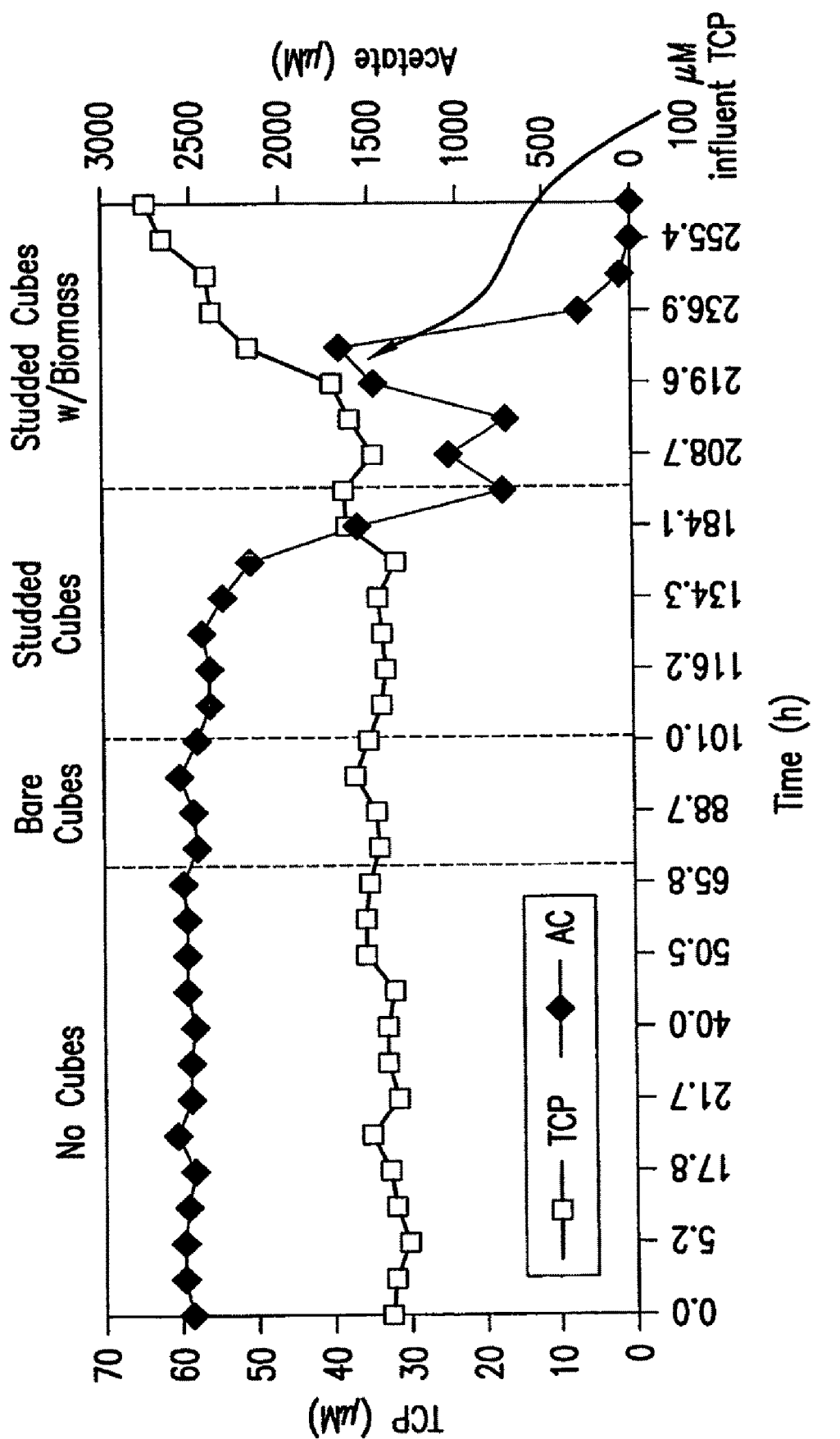
FIG. 13 reports the TCP and acetate data as measured pursuant to Example 3 as described herein.

FIG. 12 shows SEM images of the P25/surfactant-coated cubes, together with EDS analysis that clearly shows titanium coating. Larger batches of the P25/surfactant cubes were prepared for use in the PCBBR. The first PCBBR example was conducted with no cubes (UV-light only), bare cubes (no catalyst, no biomass), $TiO_2$ studded cubes (no biomass), and studded cubes with biomass. The TCP and acetate data are shown in FIG. 13. The influent conditions were 50 μM TCP and 2.5 mM acetate. Typically 20-40% of the influent TCP is removed via air stripping, explaining the 30-35 μM concentration exiting the reaction vessel. TCP removal was not enhanced upon addition of studded cubes, indicating that their photoactivity alone was not great enough to transform TCP. Changes in acetate were likely due to microbial film accumulation during the studded cubes stage, and most likely due to microbial film degradation during the last stage.

Full-intimate coupling did not show enhanced TCP removal at any point throughout the example, although acetate removal was virtually total by the end of the stage with cubes containing microbial film. Acetate removal began during the stage with studded-only cubes, likely due to the natural accumulation of microorganisms within the cubes, even though they were not inoculated prior to addition. Outstanding acetate removal and "volunteer" microbial film growth, in spite of the elevated TCP concentration, reinforce the value of microbial film protection by the carrier particles.

Figure 14:
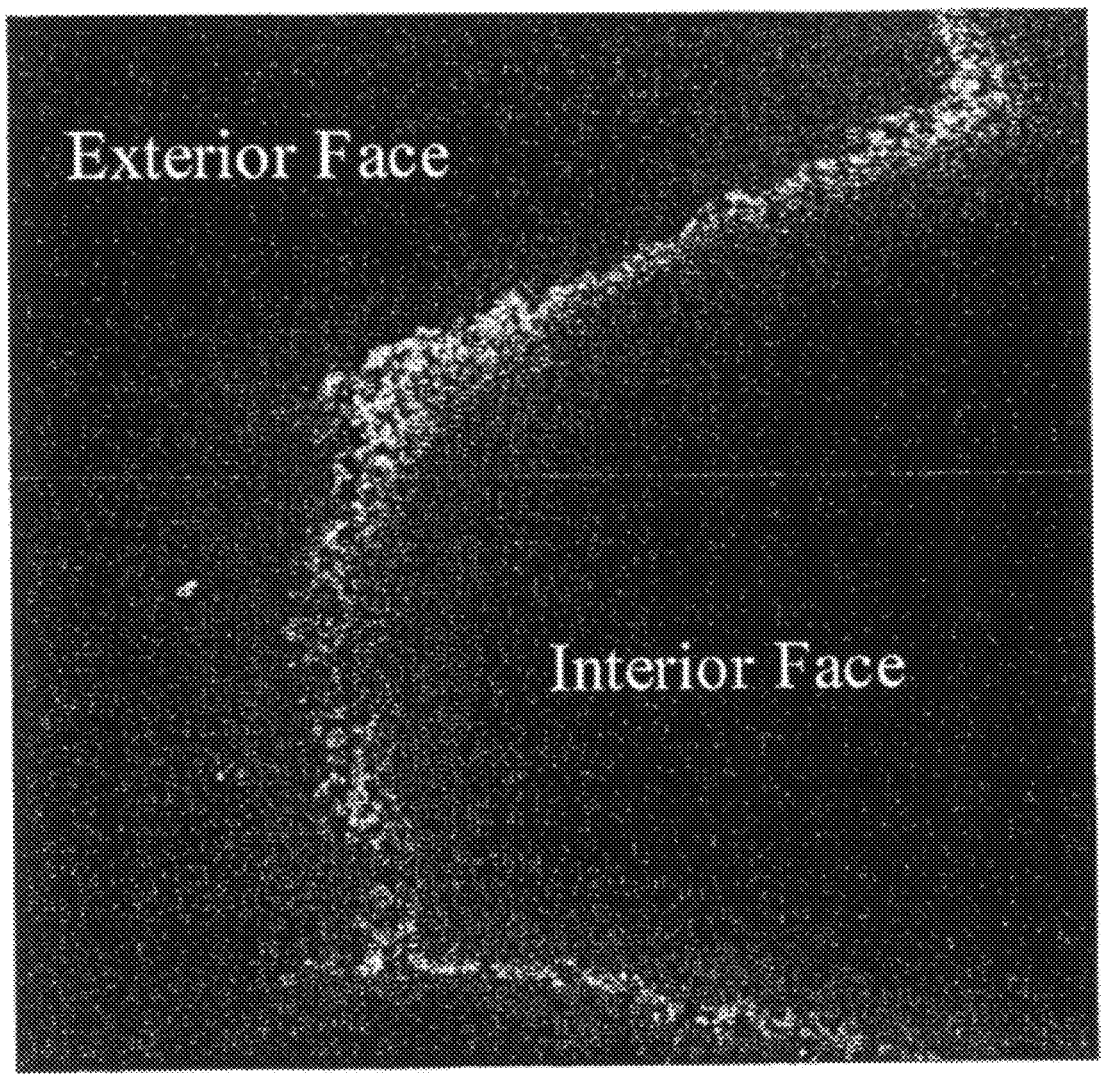
FIG. 14 depicts CLSM images of particulate carrier bed particles resulting from the completion of Example 3.

CLSM images of cubes from the end of this example, shown in FIG. 14, show an edge with a gradient from red, dead cells, to green, live cells, moving from the exterior to the interior. This is in line with photographic and SEM images that indicate the exterior of the cubes are severely challenged with photocatalytic reactants, but at a short distance inside the cube the environment is safe for the microorganisms.

Example 4

Full Intimate Coupling with Studded Cubes and Slurry $TiO_2$

Figure 15:
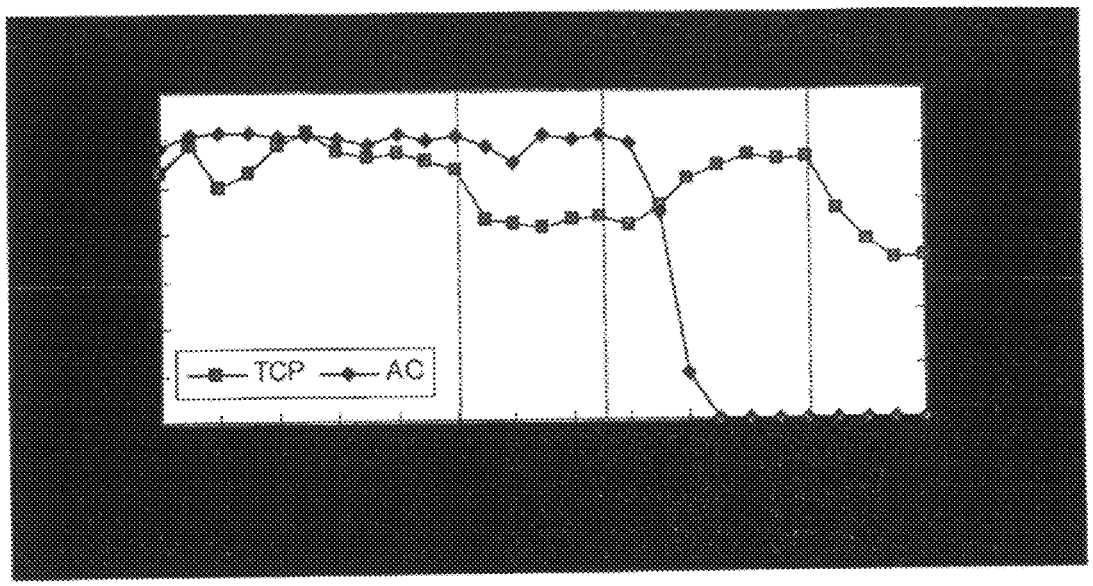
FIG. 15 shows the time profile for the TCP (95 µM influent concentration) and acetate (2.5 mM influent concentration) in the reaction vessel pursuant to the conditions of Example 4.

A second batch of $TiO_2$-coated cubes were generated to retest photocatalytic activity and to combine with slurry-$TiO_2$ to show complete coupling of coated cubes, photocatalysis, and biodegradation. FIG. 15 shows the time profile for the TCP (95 μM influent concentration) and acetate (2.5 mM influent concentration) in the reaction vessel. Upon addition of $TiO_2$-coated cubes, TCP was quickly degraded. This removal was initially maintained upon addition of coated cubes with biomass, but slowly their catalytic activity declined. Whereas photocatalysis alone did not remove acetate, addition of biomass quickly did. Addition of slurry form $TiO_2$ (0.2 g/L) quickly removed TCP again.

In contrast to the previous example, the $TiO_2$-coated cubes gave a small amount of sustained photocatalytic degradation of TCP. This demonstrates that the cubes can be photocatalyst carriers in the PCBBR. The carrier particles alone, with no biomass, gave no enhanced removal of acetate. Removing these cubes and replacing them with coated cubes containing biofilm gave TCP removal initially, showing the first ever intimately coupled photo-bio catalyst carrier and validating the ultimate premise of this work. Acetate removals ensued rapidly and increased over time. However, TCP removal decreased over time. This could be due to several factors: (1) microbial film grew over the exposed photocatalyst, diminishing catalyst available for photo-assisted reactions; (2) the microbial film produced soluble or polymeric materials that diminished the catalyst's effectiveness; or (3) the initial photocatalytic activity was from $TiO_2$ that detached from the carriers, but was slowly washed out. The first hypothesis is least likely, since $TiO_2$-coated areas of the cube that are illuminated with UV light are likely inhospitable to microorganisms. The second hypothesis is more possible if the bacteria were producing soluble microbial products (SMP) or extracellular polymeric substances (EPS) that protected them from the toxic environment, perhaps by scavenging free radicals. The strong increase in acetate removal supports that bacteria were active, and active metabolisms generate SMP and EPS. The third hypothesis would generate the TCP profile shown, but there was no noticeable sign of catalyst particles in the effluent.

Figure 16:
FIG. 16 shows a CLSM image from a cube extracted during the slurry-stage of Example 4.

Finally, slurry-form P25 $TiO_2$ (0.2 g/L) was added. The TCP concentration again decreased, while acetate remained low. FIG. 16 shows a CLSM image from a cube extracted during this slurry-stage. Live cells are evident even in these harsh conditions. The results in FIGS. 13 and 15 underscore the importance of having enough TiO2 photocatalytic activity to take full advantage of intimate coupling. Clearly, $TiO_2$ photocatalytic activity was too low with the P25/surfactant carrier particles alone, as the residual TCP concentrations remained high. Adding slurry $TiO_2$ overcame the photocatalysis limitation. Therefore, one important goal may be obtaining a carrier particle that can hold more active $TiO_2$. Ceramic materials hold promise, since they can be calcined at 500° C., which is a usual means to attach a high density of $TiO_2$ onto a surface. In exemplary embodiments, it is desirable for the carrier to have a high durability (e.g. have high rigidity), have a high internal porosity, and have a density similar to water. In addition, separate carriers for the biomass and photocatalyst will be explored to determine whether the microbial film effectively deactivated the catalyst.

In conclusion, this work demonstrated that, for the first time, the intimate coupling of UV-mediated advanced oxidation processes with biodegradation is not only possible, but highly effective, using systems and methods as described herein with regard to various aspects of the present invention. It showed that microbial film bacteria accumulated and metabolically functioned inside a porous carrier particle, even though the bulk environment was very harsh from UV irradiation, hydroxyl free radicals, and toxic TCP. It showed that the combination of $TiO_2$ photocatalysis (from slurry $TiO_2$) and microbial film biodegradation inside the macro-porous carrier gave the best removals of TCP and COD. The attempt to coat the carriers with $TiO_2$ failed to achieve enough active $TiO_2$ to improve photocatalysis, but microbial activity inside the carrier remained strong. Putting more $TiO_2$ on the carrier may achieve results similar to using slurry-$TiO_2$ and avoid the need to remove $TiO_2$ from the effluent. In addition, it may be feasible to coat the inner walls of the reaction vessel with $TiO_2$.

The intimate-coupling technology has the promise to partially oxidize hard-to-biodegrade and inhibitory organics via photocatalysis or UV-photolysis while still utilizing biodegradation to oxide fully degrade the easily biodegradable products. Microorganisms are protected within the biofilm carriers from UV radiation, harmful reactants, and toxic organics, as well as strong detachment. The application of this technology with highly active $TiO_2$-coated carriers should allow the most intimate coupling by placing the biodegradation and advanced oxidation on a single carrier, but the other options achieve the overall goal.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A system for the treatment of contaminated water, comprising:
    a particulate bed comprising a plurality of porous carrier particles having a microbial film deposited therein and effective for biodegrading at least one contaminant present within a body of water;
    a reaction vessel having an internal volume configured to recirculate the particulate bed that is disposed within the internal volume;
    at least one advanced oxidation reagent source disposed within the internal volume of the reaction vessel;
    a fluidizing mechanism configured to fluidize the particulate bed carrier particles and the at least one advanced oxidation reagent source; and
    a radiation source configured to irradiate at least a portion of the advanced oxidation reagent source contained within the reaction vessel with radiation to provide at least one advanced oxidation reagent.

2. The system of claim 1, wherein the radiation source comprises an ultraviolet light source.

3. The system of claim 1, wherein the radiation source comprises a visible light source.

4. The system of claim 1, wherein the fluidizing mechanism comprises a gas supply in communication with the reaction vessel.

5. The system of claim 4, wherein the gas supply is configured to provide an oxygen-containing gas to the reaction vessel.

6. The system of claim 1, wherein the fluidizing mechanism comprises a mechanical agitator.

7. The system of claim 1, wherein the reaction vessel comprises a contaminated water inlet, a gas inlet, a treated water outlet, and a gas outlet in communication with the internal volume of the reaction vessel.

8. The system of claim 1, wherein the advanced oxidation reagent source comprises $TiO_2$.

9. The system of claim 8, wherein $TiO_2$ is disposed within the internal volume of the reaction vessel in slurry form.

10. The system of claim 8, wherein at least one of the plurality of porous carrier particles is partially impregnated with $TiO_2$.

11. The system of claim 1, wherein at least one of the plurality of porous carrier particles is partially impregnated with the advanced oxidation reagent source.

12. The system of claim 1, wherein the advanced oxidation reagent is configured to oxidize the at least one contaminant to form a byproduct.

13. The system of claim 12, wherein the microbial film is configured to biodegrade the byproduct.

14. The system of claim 1, wherein the at least one contaminant comprises at least one recalcitrant compound.

15. The system of claim 14, wherein the porous carrier particles are configured to protect at least some of the microbial film from the at least one recalcitrant compound.

16. The system of claim 1, wherein the advanced oxidation reagent source is a photocatalyst.

17. A method of treating contaminated water, comprising:
    providing a plurality of porous carrier particles having a microbial film effective for biodegrading at least one contaminant present within a body of water;
    providing at least one advanced oxidation reagent source capable of providing at least one advanced oxidation reagent when subjected to radiation;
    introducing the plurality of porous carrier particles and the at least one advanced oxidation reagent source into an internal volume of a reaction vessel;
    introducing contaminated water containing at least one contaminant into the internal volume of the reaction vessel to thereby contact the contaminated water with the microbial film and with the at least one advanced oxidation reagent source; and
    irradiating the at least one advanced oxidation reagent source with radiation to provide at least one advanced oxidation reagent capable of oxidizing the at least one contaminant in the contaminated water and to provide at least one advanced oxidation degradation product.

18. The method of claim 17, wherein irradiating the at least one advanced oxidation reagent source with radiation comprises irradiating the at least one advanced oxidation reagent source with ultraviolet radiation.

19. The method of claim 17, wherein irradiating the at least one advanced oxidation reagent source with radiation comprises irradiating the at least one advanced oxidation reagent source with radiation in the visible light spectrum.

20. The method of claim 17, wherein the microbial film is effective for biodegrading the at least one advanced oxidation degradation product.

21. The method of claim 17, wherein the advanced oxidation reagent source is $TiO_2$.

22. The method of claim 17, further comprising studding at least the surface of the porous carrier particles with the advanced oxidation reagent source.

23. The method of claim 17, wherein providing the at least one advanced oxidation reagent source comprises providing the source in slurry form.

24. The method of claim 17, wherein the at least one contaminant comprises at least one recalcitrant compound and at least one biodegradable compound, wherein the microbial film is effective for biodegrading the at least one biodegradable compound substantially simultaneously with the advanced oxidation reagent oxidizing the recalcitrant compound to provide the at least one advanced oxidation degradation product.

* * * * *